June 3, 1924.
J. C. HOBBS
1,496,002
LINK FOR CHAIN STOKERS
Filed June 9, 1920   2 Sheets-Sheet 1
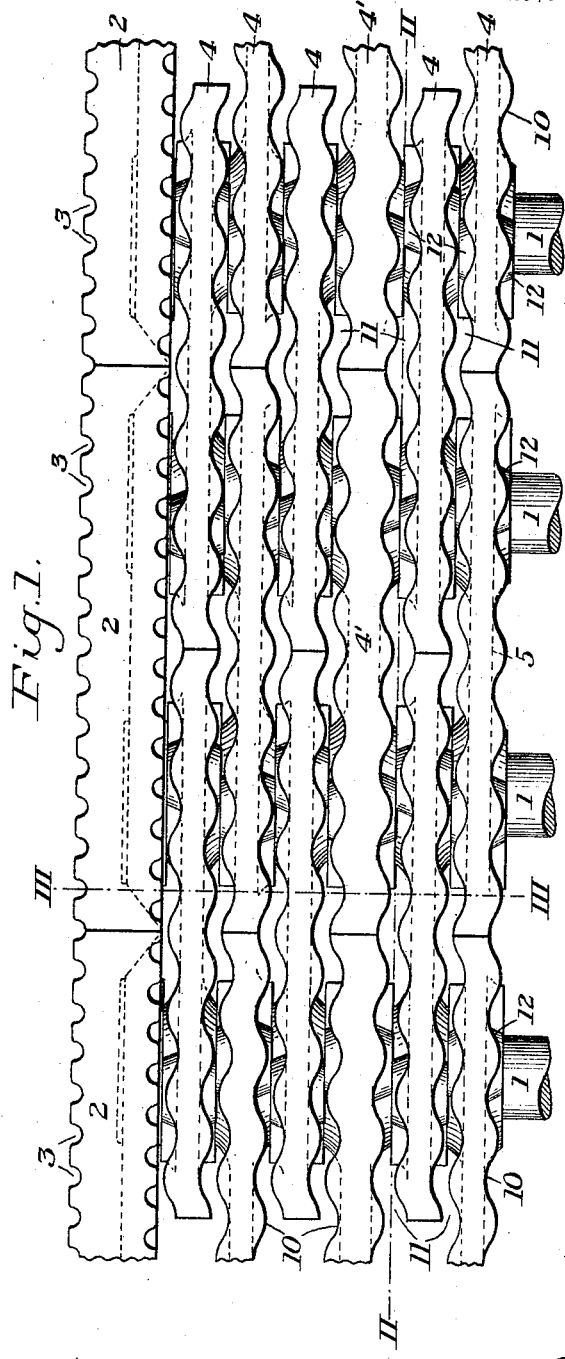
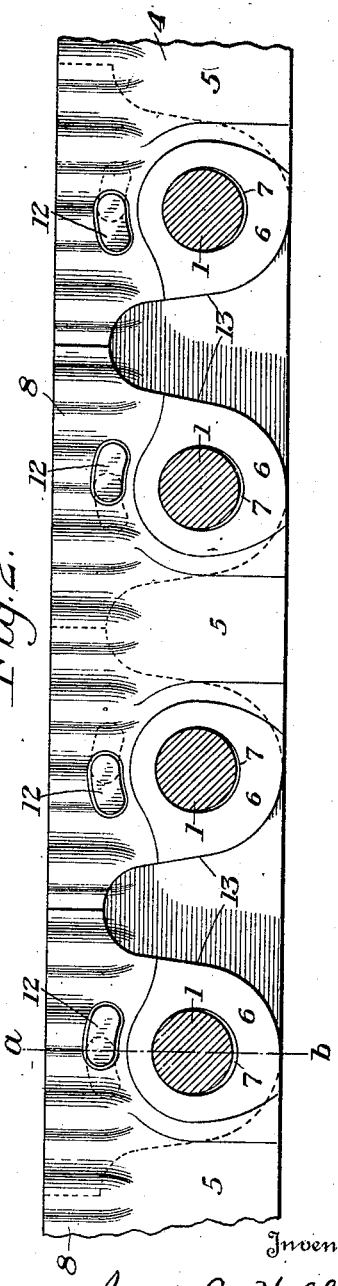
Inventor
James C. Hobbs,
By Bakewell, Byrnes, Parmelee
his Attorney June 3, 1924.

J. C. HOBBS 1,496,002

LINK FOR CHAIN STOKERS

Filed June 9, 1920

Inventor

James C. Hobbs,

By Bakewell, Byrnes Parmelee his Attorneys

Patented June 3, 1924.

1,496,002

UNITED STATES PATENT OFFICE.

JAMES C. HOBBS, OF PITTSBURGH, PENNSYLVANIA.

LINK FOR CHAIN STOKERS.

Application filed June 9, 1920. Serial No. 387,683.

*To all whom it may concern:*

Be it known that I, JAMES C. HOBBS, a citizen of the United States, residing at Pittsburgh, Allegheny County, Pennsylvania, have invented a new and useful Improvement in Links for Chain Stokers, of which the following is a full, clear, and exact description.

The present invention relates broadly to furnace grates, and more particularly to a link construction for chain stokers.

An important object of the present invention is to provide a link construction for the purpose described having such a configuration that localization of expansion and contraction strains, due to alternate heating and cooling, is eliminated.

Another object of the present invention is to provide a link construction in which the heat conducting and radiating properties are increased.

Still another object of this invention is to provide a link permitting the passage of a large amount of air to the fuel while preventing the sifting of the fuel through the grate.

A further object of the invention is to provide a link having relatively small hub portions so as not to interfere with the air supply, and having means for preventing lateral tipping of the individual links either when hot or cold.

Still a further object of the invention is to so construct said means for preventing tipping that they will be effective whether the links are running in a horizontal plane or rounding the driving mechanism.

The foregoing and other objects, together with their attendant advantages, will be apparent as the invention becomes better understood, by reference to the accompanying specification and drawings forming a part thereof, it being premised that changes may be made in the various details and the manner of operation, within the scope of the appended claims, without departing from the spirit of the invention.

Figure 1 is a plan view of a portion of a chain grate constructed of links built in accordance with the present invention.

Figure 2 is a sectional view on the line II—II of Figure 1.

Figure 3:
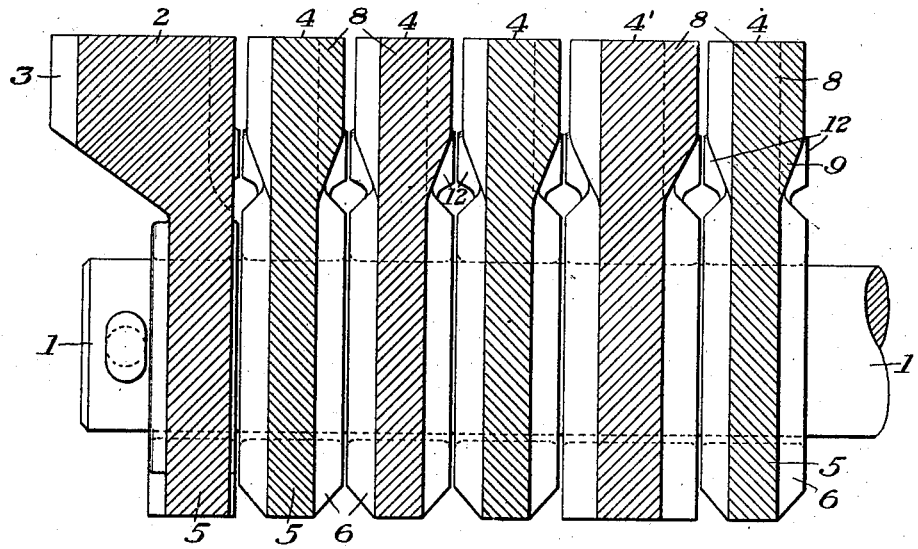
Figure 3 is a section on the line III—III of Figure 1.

I am aware that it has heretofore been proposed to construct links for chain grates by forming the links with alternate wide and narrow portions to increase the radiating surface thereof and facilitate the passage of air through the grate. In such constructions, however, there has been an abrupt change of section either in a horizontal or a vertical plane, or both, and this has resulted in localizing the strains produced by the heating and cooling action to which the links are subjected. This localization has resulted in the formation of a series of cracks or fissures extending both vertically and longitudinally of the links, thereby weakening the same and necessitating the frequent removal and renewal of certain of the sections. By means of the present invention these objections are entirely overcome.

Referring more particularly to the drawings, there is illustrated in Figure 1 a portion of a chain grate, comprising the usual chain grate rods 1 extending transversely of the grate structure, and having their ends secured in relatively wide side links 2. In Figure 1 there are illustrated side links having irregular sides produced by spaced abrupt depressions 3. These side links are of special construction, but have been found satisfactory for use adjacent the sides of the furnaces where the temperatures are comparatively low. For use throughout the main body of the grate there are provided links 4 constructed in accordance with the present invention. The section of the grate illustrated is shown as provided with a row of side links, three rows of idle links and a row of driving links 4'. The arrangement of driving links and idle links may, however, be such as to meet the particular requirements with which the grate must comply.

Each of the links 4 and 4' preferably comprises a relatively thin body portion 5 provided adjacent the ends thereof with small hubs 6 through which are formed openings 7 to permit the links to be loosely strung on the grate rods. Formed integrally with the main body portion 5 is a relatively thick fuel supporting portion 8, these two portions being connected by an intermediate tapered portion 9 of gradually decreasing cross-sectional area toward the base of the links. This gradual change in section has been found, in actual practice, to be very desirable as it prevents the formation of longitudinally extending fissures at the point of union between the grate-forming portion and the body portion, such as have occurred where the union has been defined by an abrupt change in section. The fuel supporting portions of each of the links preferably have sinuous parallel sides 10. Due to this arrangement, the cross-sectional areas through the grate-forming portions in planes extending at right angles to the longitudinal axis of the link are equal. This constant area, and uniform formation of the sides producing a uniform heat radiating surface, prevents localization of any strains caused by heating or cooling and thereby prevents the formation of vertically extending fissures such as have occurred in links heretofore constructed. It will be apparent that the idle links 4 and the driving links 4' are similarly constructed, the only difference being in the relative sizes thereof.

The construction described also permits the ready assembly of the links in end-to-end and side-by-side relationship, forming continuously extending air passages 11 through which air may pass from the bottom of the grate into the fuel bed. Due to the continuously changing angularity of the sides of the air channels, the sifting of fuel through the grate is impeded.

Figure 4:
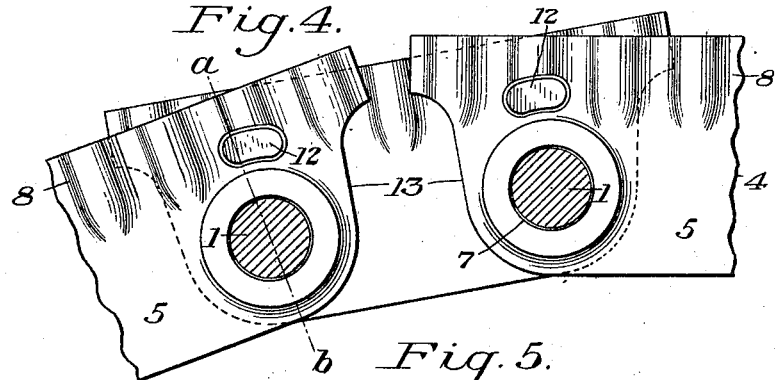
Figure 4 is a detail view illustrating the position of the links while rounding the driving mechanism.

In order to permit expansion of the links when heated, it is necessary to string the same on the grate rods loosely, so that when cold a small space remains between the hubs of adjacent links. This space is sufficient to permit a slight tipping of the individual links, and in order to prevent this action each of the links is provided adjacent the opposite ends thereof with spacing projections 12 which are preferably arcuate in shape and extend concentric to the grate rods. These projections have the major portion of their length extending to one side of a vertical line $ab$ extending through the center of the openings 7 whereby overlapping relationship of the projections will be maintained when the links are passing around the driving mechanism and assume the position illustrated in Figure 4. It is desirable that the spacing projections be as small as possible to prevent their offering any considerable obstruction to the passage of air to the fuel bed, so that the arrangement described has been found to possess maximum efficiency.

The ends 13 of the links are so shaped that each end is adapted to co-operate with substantially one-half of a sprocket tooth of the ordinary driving mechanism whereby motion may be conveniently imparted to the grate.

Figure 5:
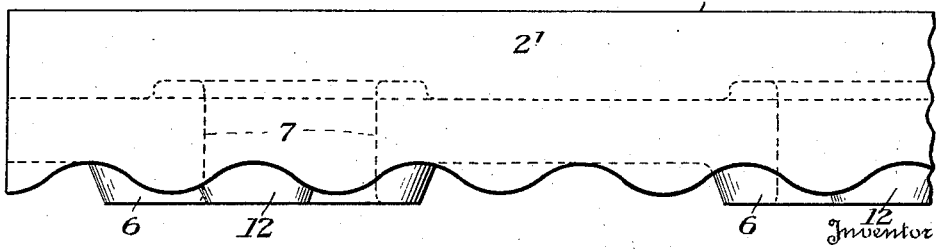
Figure 5 is a plan view of a portion of a modified form of side link.

In Figure 5 there is illustrated a side link 2' especially constructed for use in connection with the links already described. This link is provided with a smooth outer surface 3' and with a sinuous inner surface conforming to the contour of the adjacent links used in connection therewith. Where the side links are subjected to any considerable temperature changes, it is desirable to substitute the specially constructed side link 2' for the links 2, as the abrupt change in sections is eliminated.

The advantages of the present invention arise from the provision of links constructed in such a manner that abrupt changes in section are avoided and a maximum air space is provided.

Further advantages of the invention arise from the means for preventing tipping of the links and for impeding the sifting of fuel through the grate.

I claim:

1. In a chain stoker, grate rods, and links having spaced openings through which said rods pass, each of said links having continuously and uniformly curved sinuous sides, said links being arranged in a plurality of rows, each having the links thereof extending in end to end relationship, to form a fuel supporting surface having continuously uniform air passages between links of adjacent rows throughout the entire length of the fuel supporting surface of the grate.

2. In a chain stoker, grate rods, and links having spaced openings through which said rods pass, each of said links having continuously and uniformly curved sinuous sides, said links being arranged in a plurality of rows, each having the links thereof extending in end to end relationship, to form a fuel supporting surface having continuously uniform air passages between links of adjacent rows throughout the entire length of the fuel supporting surface of the grate, said links being mounted on said rods with the joints between the links in adjacent rows in staggered relationship.

3. A tension link for chain stokers, comprising a fuel supporting portion having sinuous sides throughout substantially the entire length of said portion, said portion being of substantially uniform cross-sectional area throughout the entire length of the link.

4. In a link for chain stokers, a relatively thin body portion substantially rectangular in cross section, a relatively thick fuel supporting portion substantially rectangular in cross section and having uniformly formed gradually curved sinuous sides free from any abrupt changes in section, and an intermediate portion connecting said portions gradually tapered toward the body portion.

5. In a link for chain stokers, a fuel supporting portion having gradually curved sinuously extending sides substantially parallel throughout the entire length of the link, said fuel supporting portion being free from any abrupt changes of section, a body portion carrying said fuel supporting portion and having a different thickness than the latter, and an intermediate portion connecting said fuel supporting portion and said body portion and gradually tapered toward the portion of less thickness.

6. In a link for chain stokers, a fuel supporting portion having gradually, uniformly and continuously curved sinuous sides substantially parallel throughout the entire length of the link, the sides of said fuel supporting portion being free from any abrupt changes of section, said link having spaced grate rod receiving openings formed therein.

7. In a tension link for chain stokers, a fuel supporting portion having regularly and uniformly curved sinuous sides extending the entire length of both the sides of the link and substantially parallel throughout the length of the link, and having spaced grate rod openings formed therein for placing the link under tension during use.

8. In a tension link for chain stokers, a fuel supporting portion having regularly curved sinuous sides extending the entire length of both the sides of the link and substantially parallel throughout the length of the link, said link having each end shaped to directly cooperate with substantially one-half of a sprocket tooth and form a driving engagement therewith, and having spaced grate rod receiving openings formed therein.

9. In a tension link of the character described, a fuel supporting portion having uniformly and continuously curved sinuous sides and a substantially uniform cross sectional area in every plane throughout the length of the link at substantially right angles to the longitudinal axis thereof, and having spaced grate rod receiving openings formed therein.

10. In a tension link of the character described, a fuel supporting portion having uniformly and continuously curved sinuous sides and a substantially uniform cross sectional area in every plane throughout the length of the link normal to its longitudinal axis, said link having each end shaped to provide driving engagement with substantially one-half of a sprocket tooth, and having spaced grate rod receiving openings formed therein.

11. In a link of the character described, a thick fuel supporting portion of substantially uniform cross sectional area having continuously curved parallel sinuous sides, a thin body portion, and an intermediate portion tapering in thickness toward the body portion.

12. In a link of the character described, a body portion, a portion adapted to support fuel, said fuel supporting portion having uniformly curved sinuous sides substantially parallel throughout the length of the link and said body portion having spaced grate rod receiving openings formed therein, and elongated projections on the sides of said link intermediate the axes of said openings and the fuel supporting surface.

13. In a link of the character described, a body portion having spaced grate rod receiving openings therein, and elongated spacing projections on said link extending substantially concentrically to said openings and each having the major portion of its body on one side of a plane normal to the longitudinal axis of the link and including the axis of its respective opening.

14. In a link of the character described, a body portion having spaced grate rod receiving openings therein, and elongated spacing projections on said link extending substantially concentrically to said openings and each having the major portion of its body on one side of a plane normal to the longitudinal axis of the link and including the axis of its respective opening, said link having each end shaped to cooperate in driving relationship with substantially one-half of a sprocket tooth.

In testimony whereof, I have hereunto set my hand.

JAMES C. HOBBS.